(12) United States Patent
Matsubayashi

(10) Patent No.: US 8,380,046 B2
(45) Date of Patent: Feb. 19, 2013

(54) PROGRAM RECORDING ASSIST APPARATUS, VIDEO RECORDING AND PLAYBACK APPARATUS, AND PROGRAM RECORDING ASSIST METHOD

(75) Inventor: Kazuhiro Matsubayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 891 days.

(21) Appl. No.: 12/403,913

(22) Filed: Mar. 13, 2009

(65) Prior Publication Data

US 2009/0232476 A1 Sep. 17, 2009

(30) Foreign Application Priority Data

Mar. 13, 2008 (JP) ................................. 2008-064248

(51) Int. Cl.
*H04N 9/80* (2006.01)

(52) U.S. Cl. ........................................ 386/252; 386/248

(58) Field of Classification Search .................. 386/248, 386/252

See application file for complete search history.

(56) References Cited

U.S. PATENT DOCUMENTS

2003/0190044 A1* 10/2003 Higashi et al. ................. 380/201
2006/0077825 A1* 4/2006 Nonaka et al. ............. 369/47.12

FOREIGN PATENT DOCUMENTS

| JP | 2003-169279 | 6/2003 |
| JP | 2006-050171 | 2/2006 |
| JP | 2006-216130 | 8/2006 |

* cited by examiner

*Primary Examiner* — Thai Tran
*Assistant Examiner* — Tracy Mangialaschi
(74) *Attorney, Agent, or Firm* — Canon USA Inc. IP Division

(57) ABSTRACT

A program recording assist apparatus is configured to notify permission or inhibition of copying or moving of program data of an unrecorded program designated to be recorded, before recording or moving the program data to a recording medium. The apparatus includes a determination unit configured to determine permission or inhibition of sequential recording or moving of the program data to a plurality of recording mediums based on a copy control attribute of the program, type of recording medium, and a recording mode used at a time of recording to the recording medium, and a control unit configured to display a path capable of recording or moving the program data to the plurality of recording mediums on a display device based on the result determined by the determination unit.

12 Claims, 19 Drawing Sheets

| PROGRAM NAME: ○○○○○○○ BS-001 HDTV COPY ONCE ||||||
|---|---|---|---|---|---|
| RECORDING DESTINATION || I/F | COPYING/MOVE DESTINATION || COPYING/MOVE PERMISSION/ INHIBITION |
| RECORDING MEDIUM | MODE | | RECORDING MEDIUM | MODE | |
| HDD (IN TELEVISION) | TS | iVDR | HDD (iVDR) | TS | MOVE PERMISSION |
| | | | | EXCEPT TS | MOVE PERMISSION |
| | | i.LINK | HDD (BD RECORDER) | TS | MOVE PERMISSION |
| | | INDIRECT | BD | TS | MOVE PERMISSION |
| | | | HDD (LAN) | | INHIBIT |

FIG. 4

| COPY ONCE | | | |
|---|---|---|---|
| IMAGE RECORDING DESTINATION | | | IMAGE RECORDING PERMISSION/INHIBITION |
| RECORDING MEDIUM | MODE | I/F | |
| HDD (IN TELEVISION) | TS | TELEVISION | IMAGE RECORDING PERMISSION |
| | EXCEPT TS | TELEVISION | IMAGE RECORDING PERMISSION |
| HDD (LAN) | TS | LAN | IMAGE RECORDING PERMISSION |
| HDD (iVDR) | TS | iVDR | IMAGE RECORDING PERMISSION |
| | EXCEPT TS | iVDR | IMAGE RECORDING PERMISSION |
| HDD (BD RECORDER) | TS | CEC | IMAGE RECORDING PERMISSION |
| | EXCEPT TS | CEC | IMAGE RECORDING PERMISSION |
| BD (CPRM) | TS | CEC | IMAGE RECORDING PERMISSION |
| | EXCEPT TS | CEC | IMAGE RECORDING PERMISSION |

FIG. 5

| COPY FREE | | | |
|---|---|---|---|
| IMAGE RECORDING DESTINATION | | | IMAGE RECORDING PERMISSION/INHIBITION |
| RECORDING MEDIUM | MODE | I/F | |
| HDD (IN TELEVISION) | TS | TELEVISION | IMAGE RECORDING PERMISSION |
| | EXCEPT TS | TELEVISION | IMAGE RECORDING PERMISSION |
| HDD (LAN) | TS | LAN | IMAGE RECORDING PERMISSION |
| HDD (iVDR) | TS | iVDR | IMAGE RECORDING PERMISSION |
| | EXCEPT TS | iVDR | IMAGE RECORDING PERMISSION |
| HDD (BD RECORDER) | TS | CEC | IMAGE RECORDING PERMISSION |
| | EXCEPT TS | CEC | IMAGE RECORDING PERMISSION |
| BD | TS | CEC | IMAGE RECORDING PERMISSION |
| | EXCEPT TS | CEC | IMAGE RECORDING PERMISSION |

FIG. 6

| DUBBING 10 | | | |
|---|---|---|---|
| IMAGE RECORDING DESTINATION | | | IMAGE RECORDING PERMISSION/INHIBITION |
| RECORDING MEDIUM | MODE | I/F | |
| HDD (IN TELEVISION) | TS | TELEVISION | IMAGE RECORDING PERMISSION |
| | EXCEPT TS | TELEVISION | IMAGE RECORDING PERMISSION |
| HDD (LAN) | TS | LAN | IMAGE RECORDING PERMISSION |
| HDD (iVDR) | TS | iVDR | IMAGE RECORDING PERMISSION |
| | EXCEPT TS | iVDR | IMAGE RECORDING PERMISSION |
| HDD (BD RECORDER) | TS | CEC | IMAGE RECORDING PERMISSION |
| | EXCEPT TS | CEC | IMAGE RECORDING PERMISSION |
| BD (CPRM) | TS | CEC | IMAGE RECORDING PERMISSION |
| | EXCEPT TS | CEC | IMAGE RECORDING PERMISSION |

FIG. 7

| PROGRAM NAME: ○○○○○○○<br>BS-001 HDTV COPY ONCE ||| IMAGE RECORDING PERMISSION/ INHIBITION |
|---|---|---|---|
| IMAGE RECORDING DESTINATION ||| |
| RECORDING MEDIUM | MODE | I/F | |
| HDD (IN TELEVISION) | TS | TELEVISION | IMAGE RECORDING PERMISSION |
|  | EXCEPT TS | TELEVISION | IMAGE RECORDING PERMISSION |
| HDD (LAN) | TS | LAN | IMAGE RECORDING PERMISSION |
| HDD (iVDR) | TS | iVDR | IMAGE RECORDING PERMISSION |
|  | EXCEPT TS | iVDR | IMAGE RECORDING PERMISSION |
| HDD (BD RECORDER) | TS | CEC | IMAGE RECORDING PERMISSION |
|  | EXCEPT TS | CEC | IMAGE RECORDING PERMISSION |
| HDD (CPRM) | TS | CEC | IMAGE RECORDING PERMISSION |
|  | EXCEPT TS | CEC | IMAGE RECORDING PERMISSION |

FIG. 8

| COPY ONCE | | | | | |
|---|---|---|---|---|---|
| COPYING/MOVE SOURCE | | I/F | COPYING/MOVE DESTINATION | | COPYING/MOVE PERMISSION/ INHIBITION |
| RECORDING MEDIUM | MODE | | RECORDING MEDIUM | MODE | |
| HDD (IN TELE- VISION) | TS | iVDR | HDD (iVDR) | TS | MOVE PERMISSION |
| | | | | EXCEPT TS | MOVE PERMISSION |
| | | i.LINK | HDD (BD RECORDER) | TS | MOVE PERMISSION |
| | EXCEPT TS | iVDR | HDD (iVDR) | EXCEPT TS | MOVE PERMISSION |
| HDD (LAN) | TS | LAN | HDD (LAN) | TS | MOVE PERMISSION |
| HDD (iVDR) | TS | iVDR | HDD (IN TELEVISION) | TS | MOVE PERMISSION |
| | | | | EXCEPT TS | MOVE PERMISSION |
| | | iVDR | HDD (iVDR) | TS | MOVE PERMISSION |
| | | | | EXCEPT TS | MOVE PERMISSION |
| | | i.LINK | HDD (BD RECORDER) | TS | MOVE PERMISSION |
| | EXCEPT TS | iVDR | HDD (IN TELEVISION) | EXCEPT TS | MOVE PERMISSION |
| HDD (BD RECORDER) | TS | i.LINK | HDD (BD RECORDER) | TS | MOVE PERMISSION |
| | | RECORDER | BD | TS | MOVE PERMISSION |
| | | | | EXCEPT TS | MOVE PERMISSION |
| | EXCEPT TS | RECORDER | BD | EXCEPT TS | MOVE PERMISSION |

FIG. 9

| COPY FREE | | | | | |
|---|---|---|---|---|---|
| COPYING/MOVE SOURCE | | I/F | COPYING/MOVE DESTINATION | | COPYING/MOVE PERMISSION/ INHIBITION |
| RECORDING MEDIUM | MODE | | RECORDING MEDIUM | MODE | |
| HDD (IN TELE- VISION) | TS | iVDR | HDD (iVDR) | TS | COPYING PERMISSION |
| | | | | EXCEPT TS | COPYING PERMISSION |
| | | i.LINK | HDD (BD RECORDER) | TS | COPYING PERMISSION |
| | EXCEPT TS | iVDR | HDD (iVDR) | EXCEPT TS | COPYING PERMISSION |
| HDD (LAN) | TS | PC | HDD (LAN) | TS | COPYING PERMISSION |
| | | | | EXCEPT TS | COPYING PERMISSION |
| | | PC | BD | TS | COPYING PERMISSION |
| | | | | EXCEPT TS | COPYING PERMISSION |
| | EXCEPT TS | PC | HDD (LAN) | EXCEPT TS | COPYING PERMISSION |
| | | PC | BD | EXCEPT TS | COPYING PERMISSION |
| HDD (iVDR) | TS | iVDR | HDD (IN TELEVISION) | TS | COPYING PERMISSION |
| | | | | EXCEPT TS | COPYING PERMISSION |
| | | iVDR | HDD (iVDR) | TS | COPYING PERMISSION |
| | | | | EXCEPT TS | COPYING PERMISSION |
| | | i.LINK | HDD (BD RECORDER) | TS | COPYING PERMISSION |
| | EXCEPT TS | iVDR | HDD (IN TELE- VISION) | EXCEPT TS | COPYING PERMISSION |
| HDD (BD RECORDER) | TS | i.LINK | HDD (BD RECORDER) | TS | COPYING PERMISSION |
| | | RECORDER | BD | TS | COPYING PERMISSION |
| | | | | EXCEPT TS | COPYING PERMISSION |
| | EXCEPT TS | RECORDER | BD | EXCEPT TS | COPYING PERMISSION |
| BD | TS | RECORDER | HDD (BD RECORDER) | TS | COPYING PERMISSION |
| | | | | EXCEPT TS | COPYING PERMISSION |
| | | PC | HDD (LAN) | TS | COPYING PERMISSION |
| | | | | EXCEPT TS | COPYING PERMISSION |
| | EXCEPT TS | RECORDER | HDD (BD RECORDER) | EXCEPT TS | COPYING PERMISSION |
| | | PC | HDD (LAN) | EXCEPT TS | COPYING PERMISSION |

FIG. 10

| DUBBING 10 | | | | | |
|---|---|---|---|---|---|
| COPYING/MOVE SOURCE | | I/F | COPYING/MOVE DESTINATION | | COPYING/MOVE PERMISSION/ INHIBITION |
| RECORDING MEDIUM | MODE | | RECORDING MEDIUM | MODE | |
| HDD (IN TELE- VISION) | TS | iVDR | HDD (iVDR) | TS | COPYING PERMISSION (9 TIMES) |
| | | | | EXCEPT TS | COPYING PERMISSION (9 TIMES) |
| | TS | i.LINK | HDD (BD RECORDER) | TS | COPYING PERMISSION (9 TIMES) |
| | EXCEPT TS | iVDR | HDD (iVDR) | EXCEPT TS | COPYING PERMISSION (9 TIMES) |
| HDD (LAN) | TS | LAN | HDD (LAN) | TS | MOVE PERMISSION |
| HDD (iVDR) | TS | iVDR | HDD (IN TELEVISION) | TS | COPYING PERMISSION (9 TIMES) |
| | | | | EXCEPT TS | COPYING PERMISSION (9 TIMES) |
| | TS | iVDR | HDD (iVDR) | TS | COPYING PERMISSION (9 TIMES) |
| | | | | EXCEPT TS | COPYING PERMISSION (9 TIMES) |
| | TS | i.LINK | HDD (BD RECORDER) | TS | COPYING PERMISSION (9 TIMES) |
| | EXCEPT TS | iVDR | HDD (IN TELE- VISION) | EXCEPT TS | COPYING PERMISSION (9 TIMES) |
| HDD (BD RECORDER) | TS | i.LINK | HDD (BD RECORDER) | TS | COPYING PERMISSION (9 TIMES) |
| | | RECORDER | BD | TS | COPYING PERMISSION (9 TIMES) |
| | | | | EXCEPT TS | COPYING PERMISSION (9 TIMES) |
| | EXCEPT TS | RECORDER | BD | EXCEPT TS | COPYING PERMISSION (9 TIMES) |

FIG. 11A

| RECORDING DESTINATION | | I/F | COPYING/MOVE DESTINATION | | COPYING/MOVE PERMISSION/ INHIBITION |
|---|---|---|---|---|---|
| RECORDING MEDIUM | MODE | | RECORDING MEDIUM | MODE | |
| PROGRAM NAME: ○○○○○○○ BS-001 HDTV COPY ONCE | | | | | |
| HDD (IN TELEVISION) | TS | iVDR | HDD (iVDR) | TS | MOVE PERMISSION |
| | | | | EXCEPT TS | MOVE PERMISSION |
| | | i.LINK | HDD (BD RECORDER) | TS | MOVE PERMISSION |
| | | INDIRECT | BD | TS | MOVE PERMISSION |
| | | | HDD (LAN) | | INHIBIT |

FIG. 11B

| RECORDING DESTINATION | | I/F | COPYING/MOVE DESTINATION | | COPYING/MOVE PERMISSION/ INHIBITION |
|---|---|---|---|---|---|
| RECORDING MEDIUM | MODE | | RECORDING MEDIUM | MODE | |
| PROGRAM NAME: ○○○○○○○ BS-001 HDTV COPY ONCE | | | | | |
| HDD (IN TELEVISION) | EXCEPT TS | iVDR | HDD (iVDR) | EXCEPT TS | MOVE PERMISSION |
| | | | HDD (LAN) | | INHIBIT |
| | | | HDD (BD RECORDER) | | INHIBIT |
| | | | BD | | INHIBIT |

FIG. 11C

| PROGRAM NAME: ○○○○○○○ BS-001 HDTV COPY ONCE ||||||
|---|---|---|---|---|---|
| RECORDING DESTINATION || I/F | COPYING/MOVE DESTINATION || COPYING/MOVE PERMISSION/ INHIBITION |
| RECORDING MEDIUM | MODE | | RECORDING MEDIUM | MODE | |
| HDD (LAN) | TS | LAN | HDD (LAN) | TS | MOVE PERMISSION |
| | | | HDD (IN TELEVISION) | | INHIBIT |
| | | | HDD (iVDR) | | INHIBIT |
| | | | HDD (BD RECORDER) | | INHIBIT |
| | | | BD | | INHIBIT |

FIG. 11D

| PROGRAM NAME: ○○○○○○○ BS-001 HDTV COPY ONCE ||||||
|---|---|---|---|---|---|
| RECORDING DESTINATION || I/F | COPYING/MOVE DESTINATION || COPYING/MOVE PERMISSION/ INHIBITION |
| RECORDING MEDIUM | MODE | | RECORDING MEDIUM | MODE | |
| BD | TS | | HDD (LAN) | | INHIBIT |
| | | | HDD (IN TELEVISION) | | INHIBIT |
| | | | HDD (iVDR) | | INHIBIT |
| | | | HDD (BD RECORDER) | | INHIBIT |
| | | | BD | | INHIBIT |

FIG. 12

| PROGRAM NAME: △△△△△ CS-999 SDTV COPY FREE ||||||
|---|---|---|---|---|---|
| RECORDING DESTINATION || I/F | COPYING/MOVE DESTINATION || COPYING/MOVE PERMISSION/ INHIBITION |
| RECORDING MEDIUM | MODE | | RECORDING MEDIUM | MODE | |
| HDD (BUILT-IN TELE-VISION) | TS | iVDR | HDD (iVDR) | TS | COPYING PERMISSION |
| | | | | EXCEPT TS | COPYING PERMISSION |
| | | i.LINK | HDD (BD RECORDER) | TS | COPYING PERMISSION |
| | | INDIRECT | BD | TS | COPYING PERMISSION |
| | | | HDD (LAN) | | INHIBIT |

FIG. 13

| RECORDING DESTINATION | | I/F | COPYING/MOVE DESTINATION | | COPYING/MOVE PERMISSION/ INHIBITION |
|---|---|---|---|---|---|
| RECORDING MEDIUM | MODE | | RECORDING MEDIUM | MODE | |
| HDD (IN TELE-VISION) | TS | iVDR | HDD (iVDR) | TS | COPYING PERMISSION (9 TIMES) |
| | | | | EXCEPT TS | COPYING PERMISSION (9 TIMES) |
| | | i.LINK | HDD (BD RECORDER) | TS | COPYING PERMISSION (9 TIMES) |
| | | INDIRECT | BD | TS | MOVE PERMISSION |
| | | | HDD (LAN) | | INHIBIT |

PROGRAM NAME: ☐☐☐☐☐ TERRESTRIAL D-100 HDTV DUBBING 10

FIG. 16

| PROGRAM NAME: □□□□□ TERRESTRIAL D-100 HDTV DUBBING 10 |||||
|---|---|---|---|---|
| RECORDING DESTINATION || I/F | COPYING/MOVE DESTINATION || COPYING/MOVE PERMISSION/ INHIBITION |
| RECORDING MEDIUM | MODE | | RECORDING MEDIUM | MODE | |
| HDD (-IN TELE- VISION) | TS | INDIRECT | BD | TS | MOVE PERMISSION |
| HDD (iVDR) | TS | INDIRECT | | | MOVE PERMISSION |
| HDD (BD RECORDER) | TS | RECORDER | | | COPYING PERMISSION (9 TIMES) |
| HDD (LAN) | | | | | INHIBIT |

PROGRAM RECORDING ASSIST APPARATUS, VIDEO RECORDING AND PLAYBACK APPARATUS, AND PROGRAM RECORDING ASSIST METHOD

BACKGROUND OF THE INVENTION

1. Field of the Invention

The present invention relates to a program recording assist apparatus, more specifically, determining permission/inhibition of a program recording.

2. Related Background Art

Today, a recording medium for recording a television program and a recording and playback apparatus are diversified into various kinds.

The recording medium includes a hard disk drive (HDD), various kinds of removable disks (e.g., a digital versatile disk (DVD), a hard disk (HD), and a blue-ray disk (BD)), and a memory card.

The recording and playback apparatus includes various kinds of recorders and players corresponding to one or a plurality of aforementioned recording mediums. Further, some apparatuses implement functions of a recorder and a player by a personal computer (PC) and peripheral devices. Further, a television receiver can include a built-in HDD.

A user can select and use a desired type of recording medium according to a place of use, a type of recordable broadcast, and a recording and playback apparatus to be used. Further, the recording medium s are properly selected and used according to various conditions, such as image quality and sound quality at a playback time, a recording capacity, an edit function, a special playback function, compatibility between playback apparatuses, a price, and durability.

Furthermore, the recording and playback apparatuses are properly selected and used according to various conditions, e.g., an installed place, a recordable broadcast type, a recording medium to be used, image quality and sound quality at a playback time, a recording capacity, an edit function, a special playback function, and an interface with other video devices.

A need for copying a program from a recording medium (a recording medium A), in which the program is recorded from a program source, to another recording medium (a recording medium B) is also increasing owing to such a diversified use of a recording medium or a recording playback apparatus.

As for copying a broadcast program, many restrictions are imposed from a viewpoint of copyright protection.

A method for restricting the copying is roughly classified into following two methods, i.e., a first method and a second method.

In the first method, a program stream is encrypted and recorded in the recording medium A. The encrypted code is decoded to play back the program only in a case of playing back with the recording medium A. The program stream can be read from the recording medium A and recorded in another recording medium B. However, when a user tries to play back the program with the recording medium B, the apparatus is not able to decode the encrypted code, so that the program cannot be played back.

This method is used when a program is recorded in various kinds of removable disks.

As a variant of the first method, a recording and playback apparatus X encrypts and records a program stream in the recording medium A. The encrypted code can be decoded and the program stream can be played back only when the recording and playback apparatus X is used. The program stream can be read from the recording medium A and recorded in another recording medium B. However, since another playback apparatus Y cannot decode the encryption, the program recorded in the recording medium A or in the recording medium B cannot be played back by the playback apparatus Y. The recording and playback apparatus X can decode the encryptions of the program streams both in the recording medium A and the recording medium B and play back the program stream.

This method is used when a copy once program (a program which can be recorded only once) is recorded in HDD by a communication unit such as a local area network (LAN) or a universal serial bus (USB). Hereinafter, the copy once program is defined as a program which is broadcasted with a copy once attribute. In other words, the name, the copy once program, is not changed even after the program gets a copy never attribute at a time of recording.

The first method and its modification permit recording of the program stream stored in the recording medium A in another recording medium B as it is, but inhibits playing back the program with a playback apparatus except for a proper recording and playback apparatus. These methods are called "backup" from the recording medium A to the recording medium B.

In the second method, only a predetermined recording and playback apparatus X can read a program stream in the recording medium A, and in addition, deletes the program stream from the recording medium A after recording the program stream stored in the recording medium A in another recording medium B.

The second method is used when the copy once program is recorded from HDD to DVD by a communication unit, e.g., i.LINK (trademark) or iVDR (trademark).

Thus, the second method deletes the program stream from the recording medium A after recording the program stream stored in the recording medium A in another recording medium B. This method is called "move" from the recording medium A to the recording medium B.

Further, in a third method, the program stream stored in the recording medium A is recorded in another recording medium B, and there is no limitation as to a playback apparatus for playing back the recorded program in both the recording medium A and the recording medium B. Thus, the program can be played back in both the recording medium A and the recording medium B. The third method is called "copying" from the recording medium A to the recording medium B.

The copying and move have at least the following restrictions according to a copy control attribute of a program.

As for the copy once program, copying from the recording medium A to the recording medium B is inhibited and only move is permitted.

As for a copy free program (a program not having restriction of recording times), copying from the recording medium A to the recording medium B is permitted.

As for a copy never program (an unrecordable program), recording in the recording medium A itself is inhibited at a time of receiving broadcast.

As for a dubbing 10 program (a program which can be copied less than 10 times), copying after 10 times is inhibited when a number of copying time of the program reaches 9, and only move is permitted.

However, depending on the combination of a program, a recoding apparatus, and a recording medium, restrictions which are severer than the aforementioned restrictions are added.

Further, there are a number of recording mediums on which recording, copying, and move cannot be performed depending on a product specification of a recording apparatus or affinity between devices although the mediums are permitted to record, copy, and migrate on a specification.

Accordingly, since copying or move is complexly restricted depending on the combination of a copy control attribute of a program, a kind of a recording medium, and a recording and playback apparatus to be used, a user becomes so confused. Further, in future, as kinds of a recording medium and a recording apparatus increase or a specification relating to copy control is revised, controlling of copying and move is expected to be more complicated.

As for a conventional technique relating to the problem, Japanese Patent Application Laid-Open No. 2006-50171 and Japanese Patent Application Laid-Open No. 2006-216130 discuss a technique for determining whether copying or move of a program recorded in the recording medium A to another recording medium B is permitted/inhibited according to a copy control attribute of the program, and displaying a recording medium capable of copying or move.

Further, Japanese Patent Application Laid-Open No. 2006-216130 discusses a technique for determining whether recording of a program in a recording medium A is permitted/inhibited according to a copy control attribute of the program and a recording capacity, and displaying a recording medium capable of recording the program.

These conventional techniques are for determining whether copying or move of a program which is already recorded in a recording medium A, to a recording medium B is permitted/inhibited.

Therefore, the conventional techniques cannot previously prevent a mistake that the program is recorded in a recording medium A from which the program cannot be copied and moved to a recording medium B and thus cannot be played back with the recording medium B, although play-back of the program with a recording medium B is scheduled.

SUMMARY OF THE INVENTION

An embodiment of the present invention is directed to a program recording assist apparatus which can prevent a wrong selection of a recording medium to be used by presenting a current recording and a move destination so as to properly select a recording medium which will be used for copying or moving the program in future.

According to an aspect of the present invention, a program recording assist apparatus is configured to notify permission or inhibition of program data of a program, which is designated to be recorded but not recorded yet, before recording or moving the program data to a recording medium. The apparatus includes a determination unit for determining permission or inhibition of sequential recording or moving to a plurality of recording mediums based on a copy control attribute of the program, type of recording medium, and a recording mode used at a time of recording the program in the recording medium, and a control unit for displaying a path for recording or moving the program data to the plurality of recording mediums based on the result determined by the determination unit.

According to the exemplary embodiment of the present invention, the program recording assist apparatus determines permission or inhibition of copying and moving of a program designated to be recorded in another recording mediums, before recording the program in a recording medium, so that the apparatus can prevent a user from recording by mistake the program in the recording medium which cannot copy or migrate to another recording medium which is to be used in future.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 is a table illustrating permission/inhibition of recording for every recording destination of a copy once program.

FIG. 5 is a table illustrating permission/inhibition of recording for every recording destination of a copy free program.

FIG. 6 is a table illustrating permission/inhibition of recording for every recording destination of a dubbing 10 program.

FIG. 7 is an example of a screen displaying a list of recording mediums capable of recording a copy once program.

FIG. 8 is a table illustrating permission/inhibition of copying/move for every recording destination and copying/move destination of a copy once program.

FIG. 9 is a table illustrating permission/inhibition of copying/move for every recording destination and copying/move destination of a copy free program.

FIG. 10 is a table illustrating permission/inhibition of copying/move for every recording destination and copying/move destination of a dubbing 10 program.

FIGS. 11A to 11D are examples of a screen displaying a list of permission/inhibition of copying and move to a recording medium with respect to a copy once program.

FIG. 12 is an example of a screen displaying a list of permission/inhibition of copying and move to a recording medium with respect to a copy free program.

FIG. 13 is an example of a screen displaying a list of permission/inhibition of copying and move to a recording medium with respect to a dubbing 10 program.

FIG. 16 is an example of a screen displaying a list of permission/inhibition of copying and move from a recording medium with respect to a dubbing 10 program.

DETAILED DESCRIPTION OF THE EMBODIMENTS

Various exemplary embodiments, features, and aspects of the invention will be described in detail below with reference to the drawings.

Figure 1:
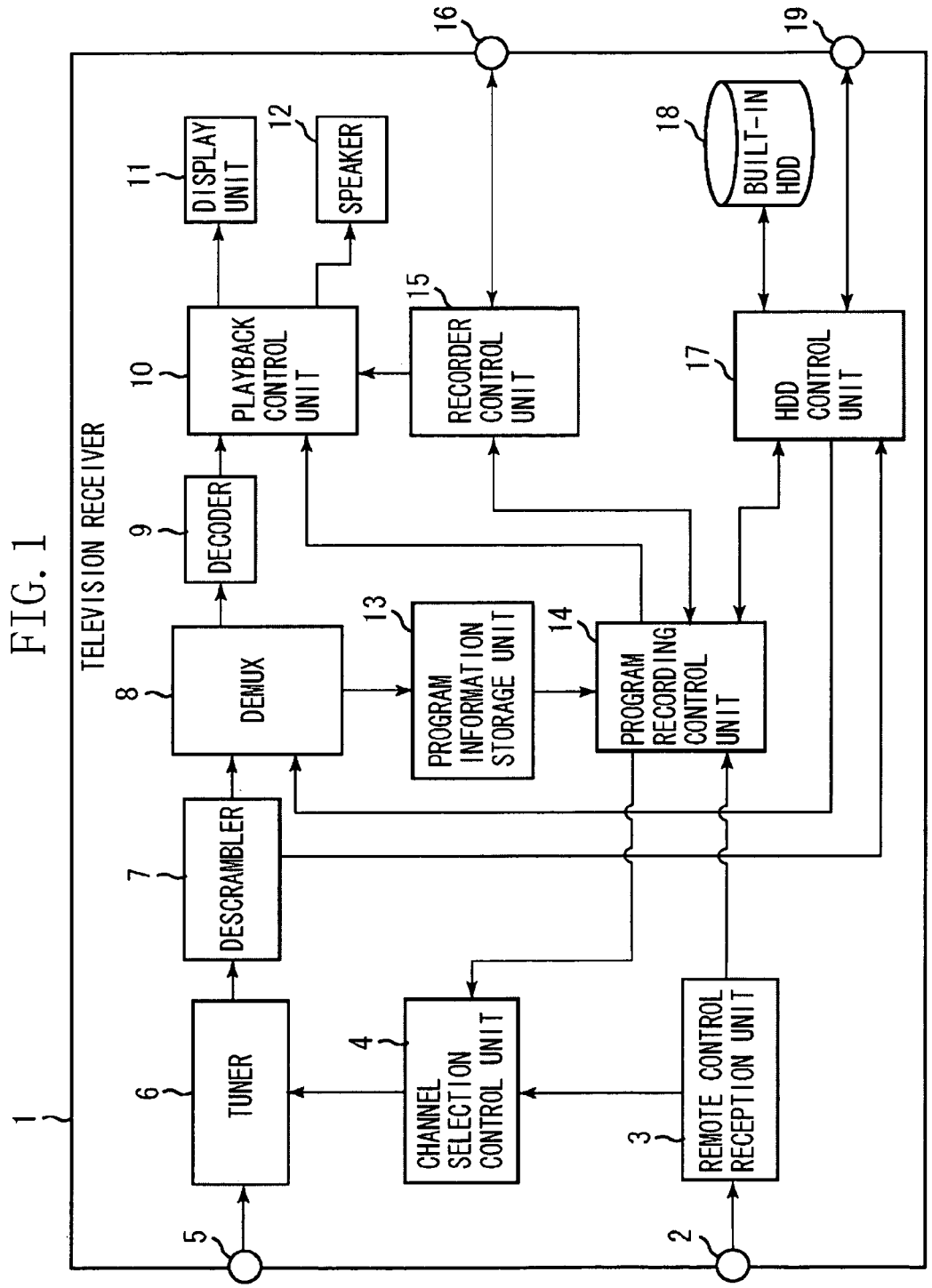
FIG. 1 is a block diagram of a television receiver having a program recording assist apparatus according to the exemplary embodiment of the present invention.

FIG. 1 is a block diagram of a television receiver 1 having a program recording assist apparatus according to the exemplary embodiment of the present invention.

The television receiver 1 is also a video recording and playback apparatus having a built-in HDD 18 and a recording control function directed to an external recording medium.

A remote control light receiving unit 2 detects a remote control signal sent from a remote control transmitter (not illustrated), and inputs the detected remote control signal into a remote control reception unit 3.

The remote control reception unit 3 analyzes an input remote control signal as a remote control code and outputs a control signal to each control unit. A channel selection control unit 4 controls a channel selection of a broadcast program or reserved recording.

An antenna terminal 5 is for inputting a broadcast wave of satellite broadcast or terrestrial broadcast from an antenna.

A tuner 6 demodulates a broadcast wave according to a channel designated by the channel selection control unit 4.

A descrambler 7 decodes scrambling in the demodulated signal using information (a key) for decoding the scrambling.

A demultiplexer (DEMUX) 8 separates program data (video data, sound data), data-broadcasting data, caption data, and program information data as an elementary stream (ES) respectively. These data are multiplexed as a transport stream (TS).

A decoder 9 decodes each encoded ES.

A playback control unit 10 includes a display control unit and a sound control unit. The display control unit displays an image on a display unit 11. The image is based on video data, data-broadcasting data, caption data, and drawing data of a graphical user interface (GUI). The played back video image is displayed on a display screen of the display unit 11. The sound control unit controls sound output to a speaker 12.

A program information storage unit 13 stores program information data separated by the DEMUX 8.

A program recording control unit 14 corresponds to the program recording assist apparatus of the present invention, determines permission/inhibition of recording at a time of recording a program in a plurality of recording mediums, and controls a recording operation. More particularly, the program recording control unit 14 provides a user interface (UI) about program recording, recording reservation, reserved recording execution, copying, and move, and performs designation of a program, designation of a recording destination, designation of a recording mode, and determination of permission/inhibition of recording.

A first method for recording a program designated to be recorded by the television receiver 1 to a recording medium uses a high-definition multimedia interface (HDMI) as an interface. The HDMI is connected with an external recording apparatus via a HDMI terminal 16, and an external recorder is controlled from a recorder control unit 15 of the television receiver 1 by a consumer electronics control (CEC). In this case, a tuner of the external recorder receives a broadcast program.

The second method for recording a program designated by the television receiver 1 is recording of the program in a built-in HDD 18 or an external HDD connected via a HDD terminal 19 as TS. An interface of the external HDD includes LAN, USB, i.LINK, or iVDR. These terminals are generically called an HDD terminal in FIG. 1. The HDD control unit 17 controls image recording in HDD based on a protocol of each interface.

The program recording control unit 14 controls any one of the recorder control unit 15 and the HDD control unit 17 according to a designated recording destination.

Further, a system control unit (not illustrated) controls each block in the entire television receiver.

Figure 2:
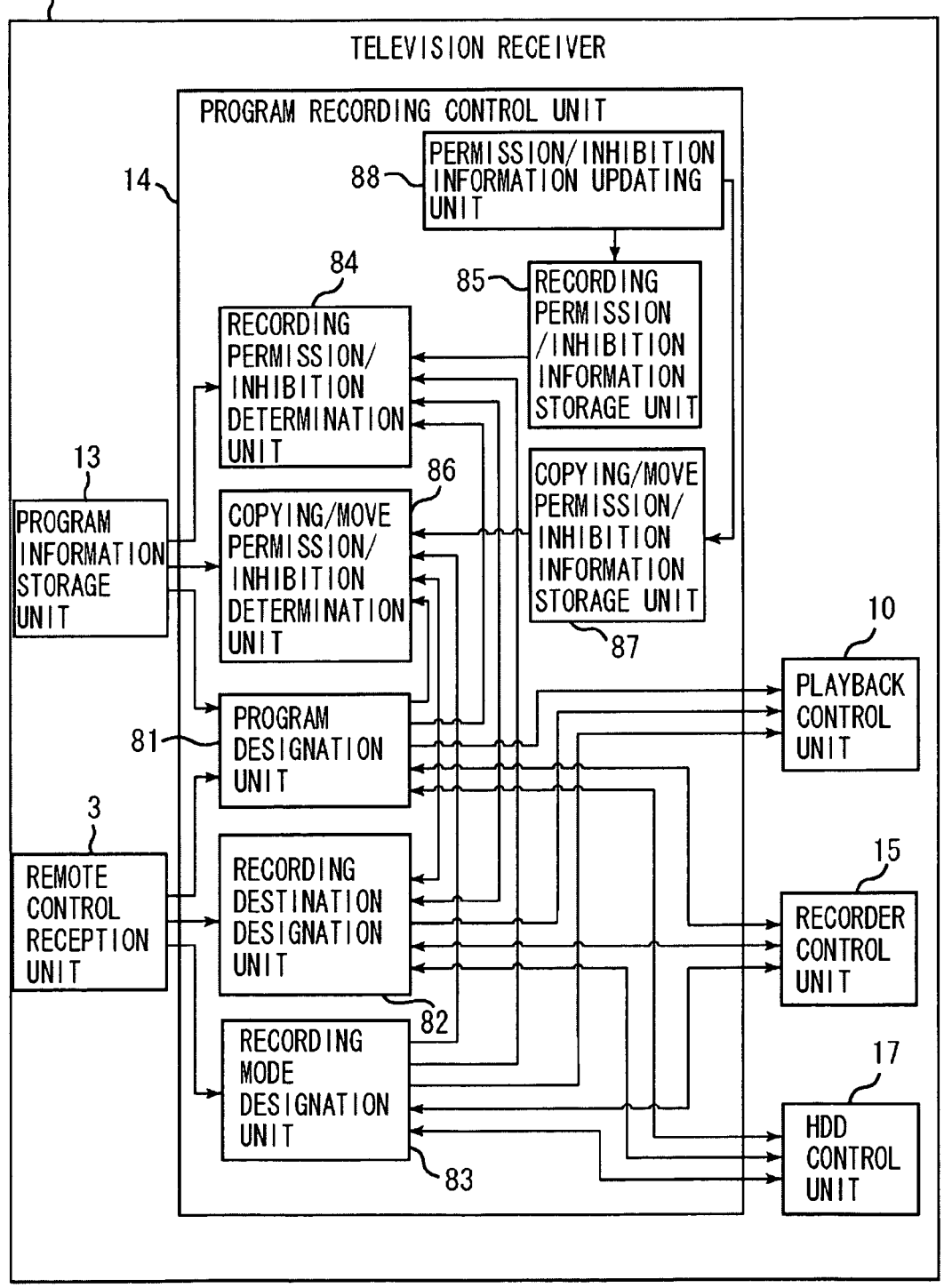
FIG. 2 is a detailed block diagram of a program recording control unit illustrated in FIG. 1.

FIG. 2 is a block diagram of the television receiver 1 illustrating the program recording control unit 14 in detail.

A program designation unit 81 provides UI for designating a program. Methods for designating a program in program recording include followings. That is, a method recording a program on the spot while viewing and listening, a method in which a user selects a program from an electronic program guide (EPG) or a program retrieval list and registers recording reservation, and a method automatically registering the recording reservation at a time of receiving program information corresponding to a previously set retrieval condition.

A recording destination designation unit 82 provides UI for designating a recording destination. The recording destination designation unit 82 displays a list of recording mediums capable of recording a program designated by a recording apparatus which can be record-controlled by the television receiver 1. A user selects a recording destination from the list.

A recording mode designation unit 83 provides UI for designating a recording mode. The recording mode designation unit 83 displays choices of a recording mode (a recording format, image quality, and sound quality) according to a designated recording medium, and a user selects a recording mode from the choices.

In this embodiment, a user causes the apparatus to display a list of recording mediums B capable of copying or moving a program from a recording medium A, by designating the recording medium A of the recording destination. When the list includes a recording medium which will be used in future, the user designates the recording mediums A as it is to be a recording destination. When the list does not include the recording medium, the user can change the recording destination.

Processing of this embodiment will be described using the flowchart in FIG. 3.

In step S101, a user designates recording of an unrecorded program from EPG by the program designation unit 81.

In step S102, a recording permission/inhibition determination unit 84 determines whether the designated program can be recorded in each recording medium which is previously registered. A recording destination designation unit 86 displays a list of recording mediums capable of recording the program on a screen based on the determined result.

In step S103, the user designates a recording medium A for recording program data and a recording mode using UI provided by the recording destination designation unit 82 and the recording mode designation unit 83.

In step S104, a copying/move permission/inhibition determination unit 86 determines whether each previously registered recording medium B can copy or migrate the program data from the recording medium A. The recording destination designation unit 82 displays a list of recording mediums B capable of copying or moving the program data from the recording medium A on a screen.

In step S105, the user confirms the list of the recording mediums B on the screen and determines whether the designated recording medium A is to be a recording destination or the recording destination is changed.

When the list does not include the recording medium B although the program is to be played back with the recording medium B in future (NO in step S105), processing returns to step S103 and the recording destination designation unit 82 can change the recording destination.

Examples of recording reservation will be described below with reference to recording permission/inhibition tables and screen examples. A recording permission/inhibition information storage unit 85 stores recording permission/inhibition information with respect to a combination of a copy control attribute of a program, a kind of a recording medium (recording medium A), and recording modes, as a table.

FIGS. 4 to 6 are tables respectively illustrating permission/inhibition of recording in each case that the copy control attribute of a program is copy once, copy free, and dubbing 10.

A combination which is not in the tables is un-recordable. A copy never program is determined to be un-recordable in every recording medium.

Recording mediums having the same recording restriction as to a copy control attribute are grouped as deemed appropriate.

For example, a recordable blue-ray disk (BD) is separated into a disk corresponding to a content protection for recordable media (CPRM) and a disk not corresponding to CPRM. Since the copy once program and the dubbing 10 program can be recorded only in a disk corresponding to CPRM, the disk corresponding to CPRM and the disk not corresponding to CPRM are distinguished in FIGS. 4 and 6. The copy free program can be recorded in both the disk corresponding to CPRM and the disk not corresponding to CPRM. Thus, the disk corresponding to CPRM and the disk not corresponding to CPRM are not distinguished in FIG. 5.

On the other hand, BD can be classified into a rewritable BD (BD-RE) and a writable BD (BD-R). In a copy once program, a copy free program, and a dubbing 10 program, BD-RE and BD-R have the same recording restriction. Thus, BD-RE and BD-R are not distinguished in FIGS. 4, 5 and 6.

The recording mode is roughly classified into TS mode and except TS mode. TS mode records a program as a transport stream and does not re-encode video or sound. Except TS mode is a general term for the mode which re-encodes video or sound and records a program with a data format except the transport stream. Actually, there are various recording modes according to an encode format (MPEG2 or MPEG4AV), resolution, and a bit rate.

The recording permission/inhibition information storage unit 85 stores permission/inhibition of recording in a unit of an actual recording mode. However, for convenience of explanation, the recording mode is indicated by two kinds, i.e. TS and EXCEPT TS in FIGS. 4, 5, and 6. FIG. 7 is an example of a screen displaying a list of recordable recording mediums in a case of designating the copy once program.

When a designated program is the copy once program, the recording permission/inhibition determination unit 84 determines permission/inhibition of recording referring to the table in FIG. 4 from among tables stored in the recording permission/inhibition information storage unit 85.

The copying/move permission/inhibition information storage unit 87 stores permission/inhibition information of copying and move with respect to a combination of a copy control attribute of a program, copying/move sources (a recording medium A), and copying/move destinations (a recording medium B) as a table.

FIG. 8 is an example of a table about the copy once program, FIG. 9 is an example of a table about the copy free program, and FIG. 10 is an example of a table about the dubbing 10 program. These tables respectively indicate permission/inhibition of copying and move. The combination which is not in the tables is not able to perform copying and move.

FIG. 11A is an example of a screen displaying a list of permission/inhibition of copying and move of the copy once program to another recording medium in a case of recording the copy once program in HDD built in television in TS mode.

A user can execute the following various kinds of operations by moving a focus to each column with an arrow key of a remote control and clicking (pushing down a determination key).

When a user clicks a recording medium column in a recording destination column, the apparatus displays a list of recording mediums that can be designated as a recording destination. When the user clicks a desired recording medium, he can switch the recording medium to be designated as a recording destination.

Further, when a user clicks a mode column in the recording destination column, the apparatus displays a recording mode which can be designated for the recording medium A. Furthermore, when the user clicks a desired recording mode, he can switch the recording mode to be designated.

The columns can be color-coded as deemed appropriate according to permission/inhibition of copying and move or other attributes.

When the copying/move destinations are BD, FIG. 11A displays MOVE PERMISSION in addition to displaying INDIRECT as an interface (I/F). This display means that although a program cannot directly migrate from the HDD built in television to BD, the program can finally migrate to BD by repeating moves to other one or more recording mediums.

More specifically, the copying/move permission/inhibition determination unit 86 determines that a program is able to migrate from HDD built in television to HDD built in BD recorder in TS mode by referring to the table of FIG. 8. Further, since the program is able to migrate from HDD built in BD recorder to BD, the copying/move permission/inhibition determination unit 86 determines the program is able to indirectly migrate from the HDD built in television to BD.

In FIG. 11A, when a user clicks the column displaying INDIRECT, a move path is sequentially displayed from HDD built in television, to HDD in BD recorder, and to BD.

FIG. 11B is an example of a screen displaying a list of permission/inhibition of copying and move of the copy once program to another recording medium in a case of recording the program in HDD built in television in except TS mode. As described above, a particular mode name (e.g., XP, SP, LP, or EP) is actually displayed as the except TS mode.

By comparing FIGS. 11A and 11B, it can be understood that permission/inhibition of copying and move is different if the recording modes are different, although the same copy once programs are recorded in the same HDD built in television.

FIG. 11C is an example of a screen displaying a list of permission/inhibition of copying and move to another recording medium in a case that a copy once program is recorded in HDD via LAN in the TS mode.

By comparing FIGS. 11A and 11C, it can be understood that permission/inhibition of copying and move is different if the recording mediums are different, although the same copy once programs are recorded in the same TS mode.

FIG. 11D is an example of a screen displaying a list of permission/inhibition of copying and move to another recording medium in a case that the copy once program is recorded in BD in the TS mode.

From FIG. 11D, it can be understood that copying and move to another recording medium is inhibited in a case that the copy once program is recorded in BD.

FIG. 12 is an example of a screen displaying a list of permission/inhibition of copying and move to another recording medium in a case that the copy free program is recorded in HDD in television in the TS mode. FIG. 13 is an example of a screen displaying a list of permission/inhibition of copying and move in a case that the dubbing 10 program is recorded in HDD in television in the TS mode.

By comparing FIGS. 11A and 12 and comparing FIGS. 11A and 13, it can be understood that permission/inhibition of copying and move is different if the copy control attributes are different, although the programs are recorded in the same HDD in television in the same TS mode.

The dubbing 10 does not permit indirect copying. Therefore, the program can be copied maximum 9 times from HDD in television to HDD in BD recorder. However, the program copied to HDD in BD recorder can be only moved to BD.

In addition, in the above description, a tabular format is used as an example screen. However, a chart figure can be used for displaying an example to give information to a viewer as follows.

When an application of a program recording assist is started by a remote control operation, EPG is displayed. When a reserved recording program is designated by EPG, a chart figure is displayed according to a copy control attribute of the reserved recording program.

The chart figure showing the results determined by the program recording control unit 14 is displayed on the same screen of the display unit 11, which is distinguished by at least one of each recording medium, each recording mode, and each interface.

Figure 14A:
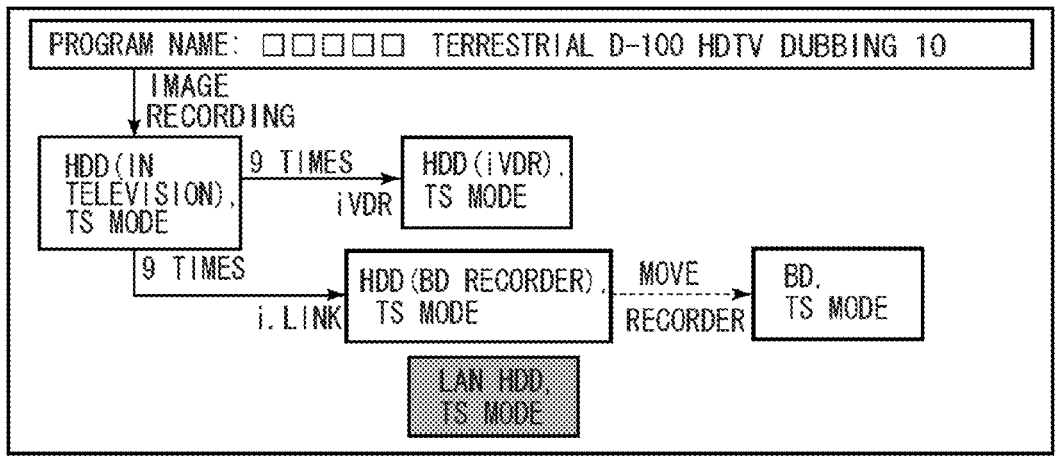
FIGS. 14A to 14C are examples of a screen displaying permission/inhibition of copying and move to a recording medium with a chart figure with respect to a dubbing 10 program.

FIG. 14A is an example of a screen displaying permission/inhibition of copying and move to another recording medium with a diagram in a case that the dubbing 10 program is recorded in HDD built in television in the TS mode.

Usable recording apparatuses built in or connected with the television receiver 1 and a recording medium provided in each recording apparatus are displayed. The chart is displayed with respect to the selected recording apparatus.

Since recording in HDD built in television is most often used, the screen in FIG. 14A can be set as a default screen of a chart. For every selected recording apparatus, the screen is switched to display a chart illustrating permission/inhibition of copying and move to another recording apparatus.

Permission of copying is indicated by a solid line arrow, and permission of move is indicated by a dotted line arrow. Further, a recording medium to which the program cannot be copies or moved is indicated by hatching. On an actual screen, color coding, three-dimensional display, or animation display can be added as deemed appropriate.

Figure 14B:
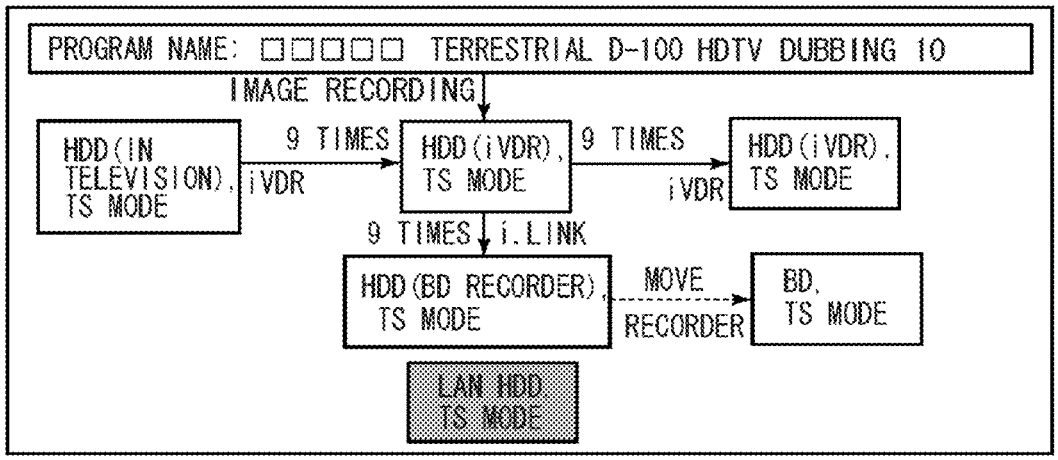

By moving a focus (a thick frame in FIG. 14A) to a right direction with a right arrow key of the remote control, a user can change a recording destination to HDD in iVDR, and a screen in FIG. 14B appears.

FIG. 14B is an example of a screen displaying permission/inhibition of copying and move to another recording medium in a case where the dubbing 10 program is recorded in HDD in iVDR in the TS mode.

Figure 14C:
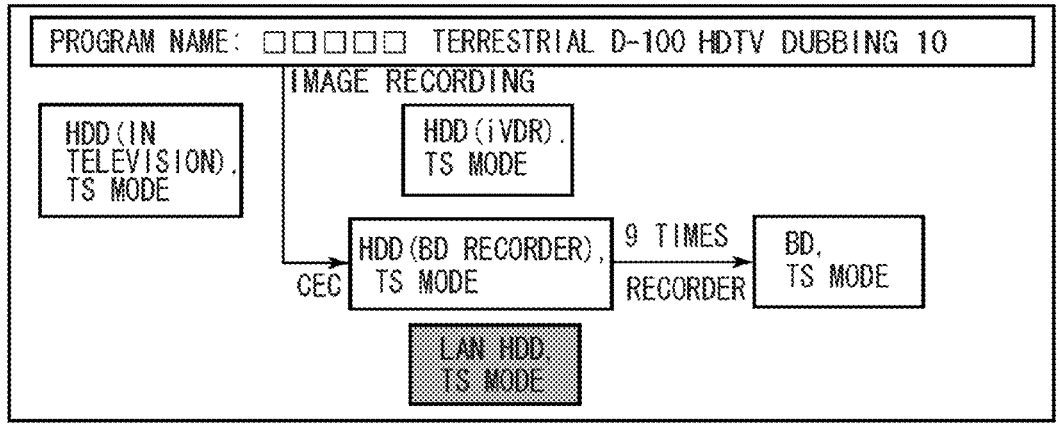

By moving a focus down with a downward arrow key of the remote control, a user can change the recording destination to HDD in BD recorder, and a screen of FIG. 14C appears.

By clicking a recording medium on each screen in FIGS. 14A, 14B and 14C, a user can display a list of recording modes which can be designated in the recording medium and select a desired recording mode.

When the recording mode is changed, permission/inhibition of copying and move is determined according to a new recording mode and a screen is updated.

When a new kind of a recording medium is put on a market or a specification relating to copy control is revised, a permission/inhibition information update unit 88 updates permission/inhibition information in the recording permission/inhibition information storage unit 85 and the copying/move permission/inhibition information storage unit 87.

For example, when a software program in a television receiver is updated by way of a broadcast wave (an engineering service), permission/inhibition information update unit 88 may update permission/inhibition information.

Alternatively, the permission/inhibition information update unit 88 may update permission/inhibition information by downloading information from an internet site of a television receiver maker, a recording apparatus maker, a recording medium maker, or a specification establishing organization.

Further, when either one of the connected television receiver and recording apparatus downloads new information, the permission/inhibition information update unit 88 can send permission/inhibition information to an apparatus of a connecting partner.

The permission/inhibition information update unit 88 can acquire information of a recording apparatus or a recording medium which a user does not yet possess. By this way, a user can refer to the acquired information when the user purchases the recording apparatus or the recording medium.

Figure 3:
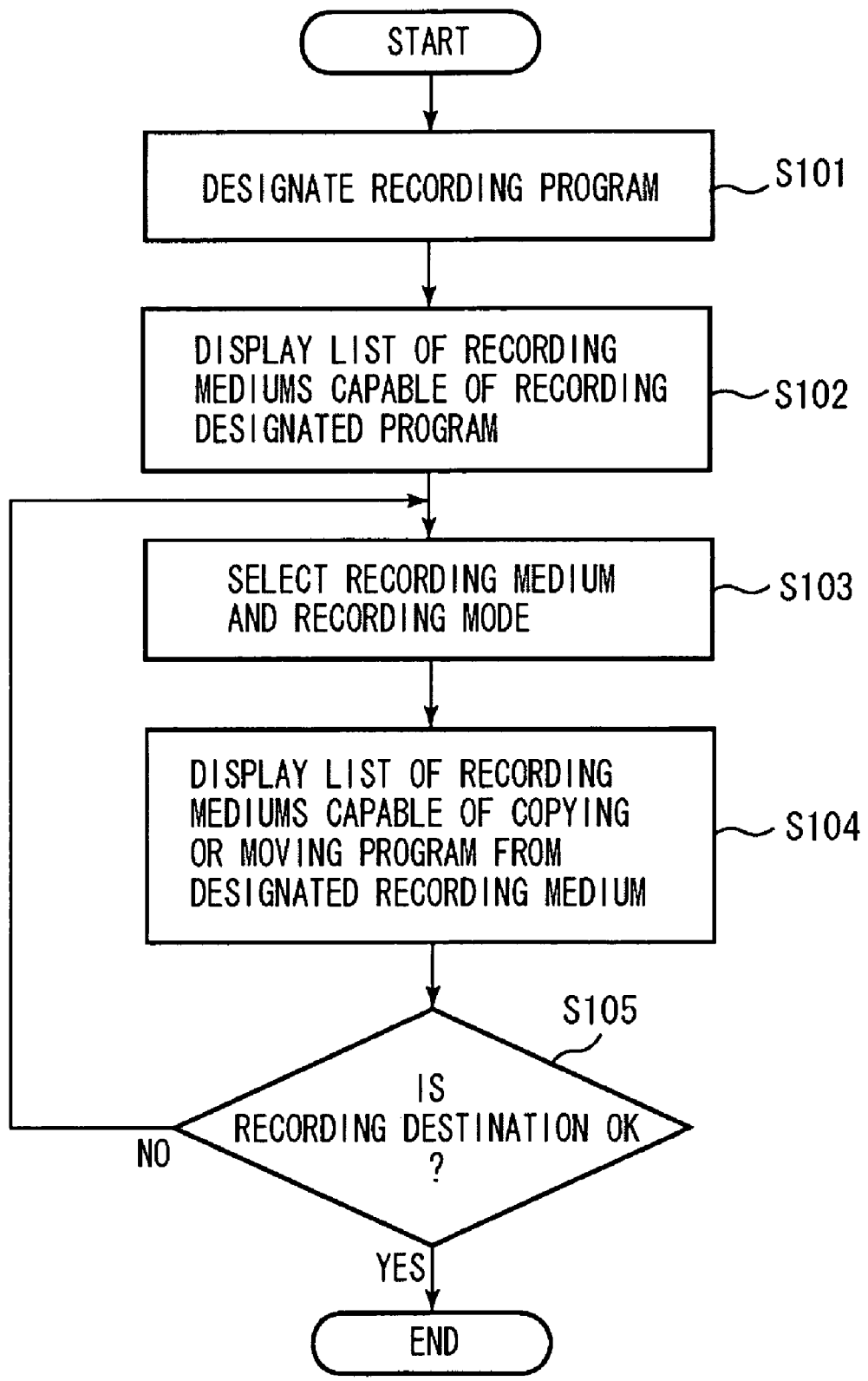
FIG. 3 is a flowchart illustrating processing according to the first exemplary embodiment of the present invention.

In addition, with respect to the flowchart of FIG. 3, the example for recording a program in the recording medium A is described. However, the present invention can also be applied to a move of a program recorded in another recording medium C to the recording medium A.

More specifically, in a case where a user causes a program to migrate from the recording medium C to the recording medium A, the user can confirm whether the program can be copied or moved from the recording medium A to the recording medium B which is to be used for recording the program in future. Then, the user can determine whether to record the program in the recording medium A as it is or to change the move destination.

In the present embodiment, a video recording and playback apparatus is a television receiver, but the present invention is not limited to this apparatus. The present invention can be widely applied to various kinds of audio visual (AV) devices such as a recorder, a personal computer, a mobile information terminal, a cellular phone, a car navigation device, and various kinds of information apparatuses such as a game machine.

Accordingly, before recording a program in the recording medium A, a user can confirm whether the program can be copied and moved from a designated recording medium A to a recording medium which is to be used for recording the program in future, and then determine whether to record the program in the recording medium A as it is or to change the recording destination.

In a second exemplary embodiment of the present invention, when a user designates a recording medium B which is to be used for recording a program in future, an apparatus displays a list of recording mediums A from which a program can be copied or moved to the recording medium B. When a user designates a plurality of the recording mediums B which are to be used for recording the program in future, the apparatus displays a list of recording mediums A from which the program can be copied or moved to all designated recording mediums B.

The configuration of a video recording and playback apparatus of the present embodiment is similar to that of the first exemplary embodiment.

Processing flow of this embodiment will be described with reference to the flowchart in FIG. 15.

In step S201, a user designates a program to be recorded using UI provided from the program designation unit 81.

In step S202, the user designates a recording medium B which is to be used for recording the designated program in future and a recording mode using UI provided by the recording destination designation unit 82 and the recording mode designation unit 83.

In step S203, the copying/move permission/inhibition determination unit 86 determines whether each previously registered recording medium A can copy or migrate the designated program to each recording medium B. The recording destination designation unit 82 displays a list of the recording mediums A capable of copying or moving the designated program to the recording medium B on a screen.

In step S204, the user selects a recording mode and a recording medium for recording the designated program from a list of the recording mediums A.

An example for reserving program will be described below with reference to a recording permission/inhibition table and a screen example.

FIG. 16 is an example of a screen displaying a list of permission/inhibition of copying and move to another recording medium in a case where a dubbing 10 program will be recorded to BD in TS mode in future.

When a user clicks a recording medium column in a copying/move destination column, the apparatus displays a list of recording mediums which can be designated as a future recording destination. Further, by clicking a desired recording medium, a user can switch the recording medium to be designated as a future recording destination.

Further, when a user clicks a mode column in a copying/move column, the apparatus displays a list of recording modes which can be designated for the recording medium B. Further, by clicking a desired recording mode, a user can switch the recording mode to be designated.

The lists of recording mediums and recording modes can be displayed using charts similar to FIGS. 14A to 14C.

Figure 17A:
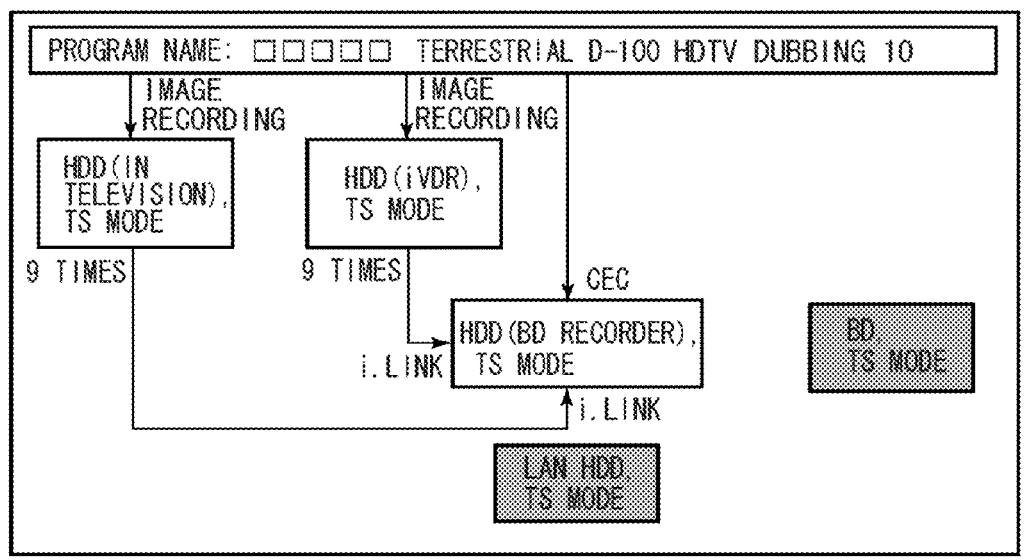
FIGS. 17A and 17B are examples of a screen displaying permission/inhibition of copying and move from a recording medium with a chart figure with respect to a dubbing 10 program.

FIG. 17A is an example of a screen displaying permission/inhibition of copying and move from another recording medium with a diagram in a case where a dubbing 10 program will be recorded in HDD built in BD recorder in TS mode in future.

Figure 17B:
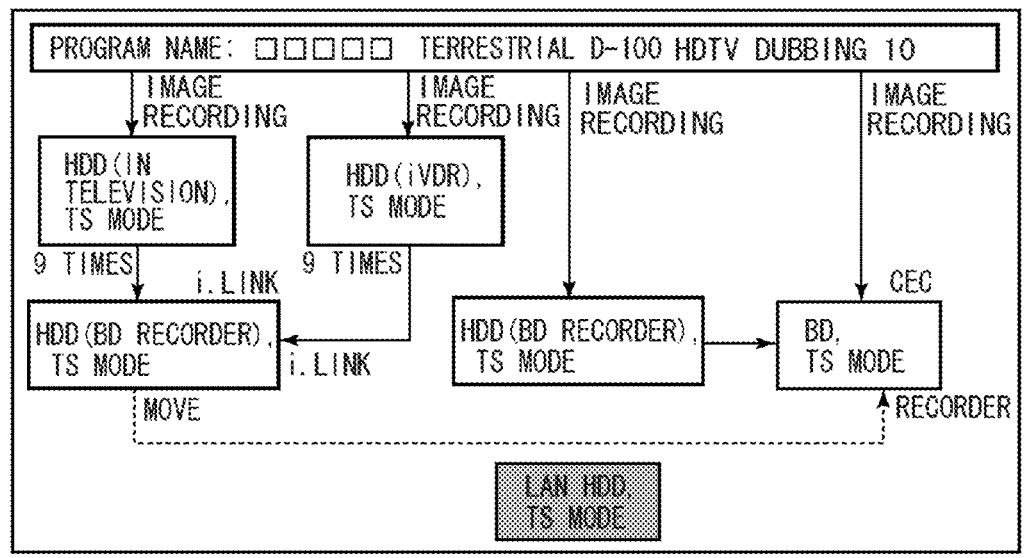

By moving a focus to the right direction with a right arrow key of a remote control, a user changes a recording destination to BD, and a screen in FIG. 17B appears.

FIG. 17B is an example of a screen displaying permission/inhibition of copying and move from another recording medium in a case where a dubbing 10 program will be recorded in BD built in TS mode in future.

When a user clicks a recording medium on the screens in FIG. 17A and FIG. 17B, the apparatus displays a list of a recording modes which can be designated by the recording medium.

When the recording mode is changed, permission/inhibition of copying and move is determined according to a new recording mode and the screen is updated.

Figure 15:
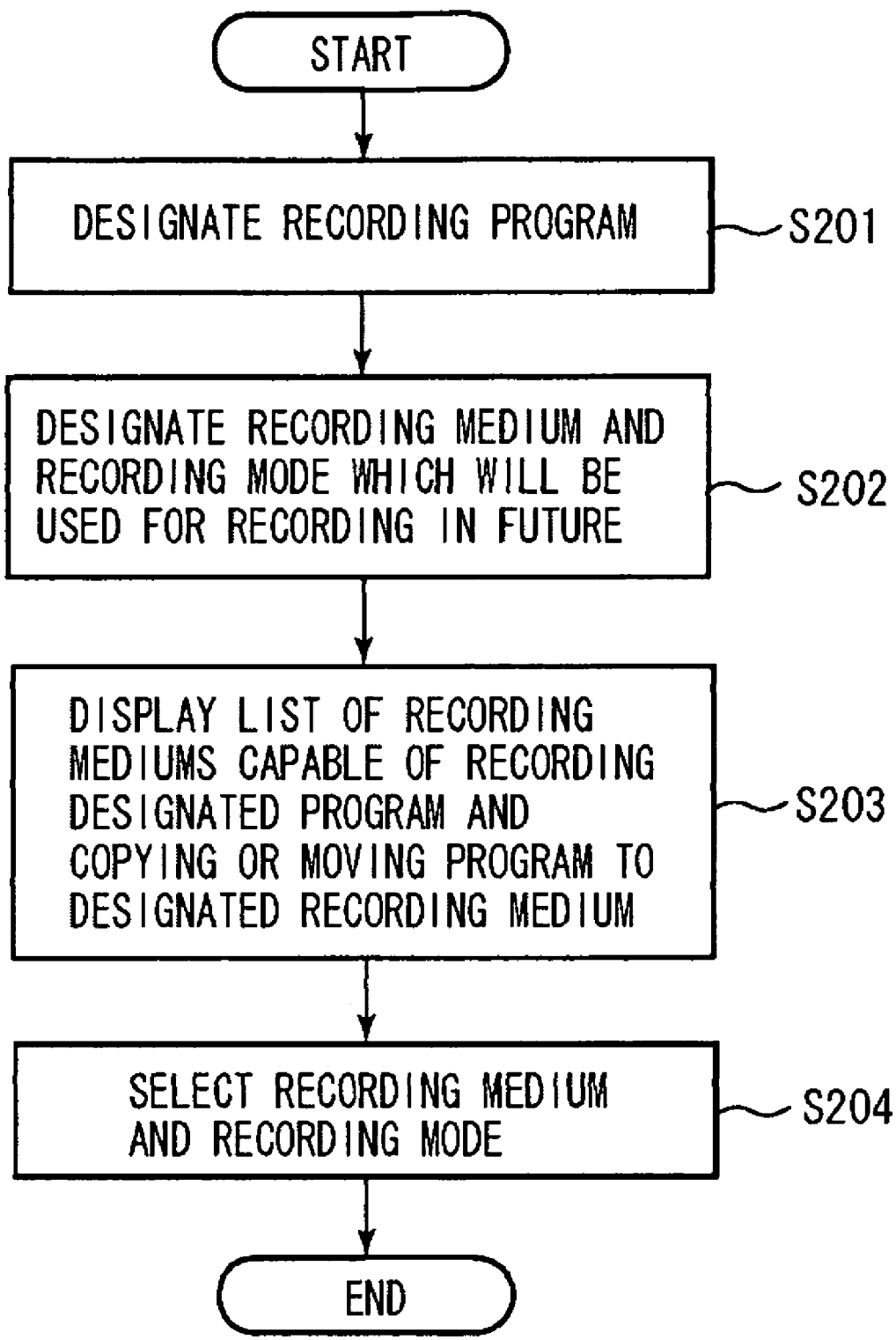
FIG. 15 is a flowchart illustrating processing according to the second exemplary embodiment of the present invention.

With respect to the flowchart of FIG. 15, an example for recording a program to the recording medium A has been described. However, the present invention can be applied to move of a program recorded in another recording medium C to the recording medium A.

More specifically, in a case where the program is moved from the recording medium C to the recording medium A, a user can select the recording medium A as a move destination from a list of recording mediums capable of copying or moving the program to the recording medium B which will be used for recording the program in future.

Accordingly, in the program recording control apparatus according to the present embodiment, a user can select the recording medium A from a list of recording mediums capable of copying or moving the program to the recording medium B which will be used for recording the program in future.

In a third exemplary embodiment of the present invention, an apparatus determines a alternative recording destination when the apparatus detects just before starting recording that a designated recording destination cannot record a program because a disk is not inserted, disk capacity is not sufficient, or reservations overlap with each other.

According to the present embodiment, a future recording destination (a recording medium B) is previously designated. When an alternative recording destination is determined, it is confirmed that a recording medium (including the recording medium B itself) can copy or migrate a program to the future recording destination, as a determination condition. However, in addition, the alternative recording destination is determined together with other conditions such as a recording time and a recoding quality.

Figure 18:
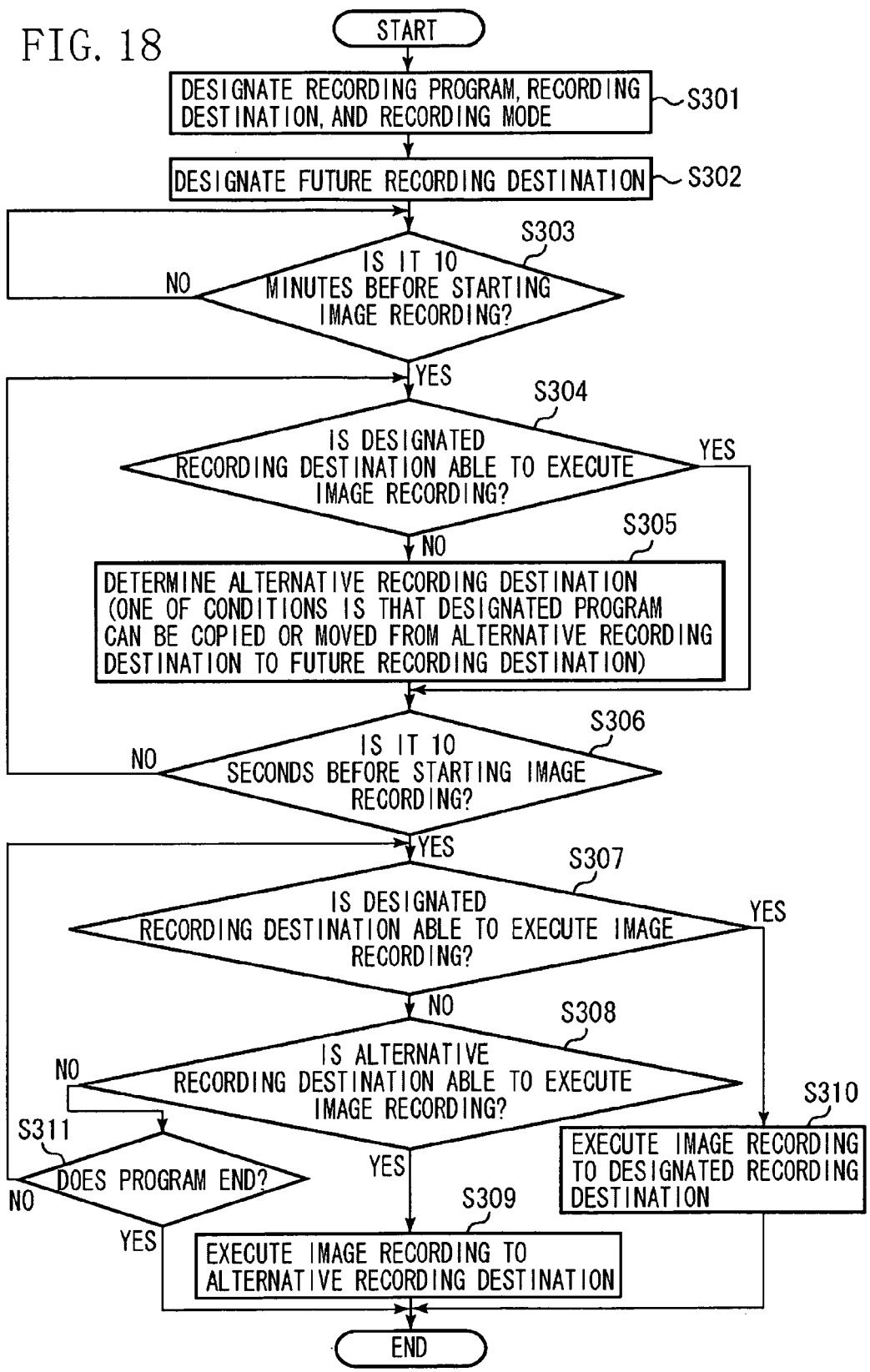
FIG. 18 is a flowchart illustrating processing according to the third exemplary embodiment of the present invention.

Processing according to the present embodiment will be described with reference to a flowchart of FIG. 18.

In step S301, a user designates a program to be recorded, a recording medium, and a recording mode using UI provided by the program designation unit 81.

In step S302, the user designates a future recording destination and a recording mode of the program using UI provided by the recording destination designation unit 82 and the recording mode designation unit 83.

In step S303, the user waits if a specified time until starting recording is not reached(10 minutes before starting recording in this embodiment).

In step S304, the recording destination designation unit 82 checks whether the recording destination designated in step S301 can record a program. For example, the recording destination designation unit 82 checks whether a disk is inserted, recording capacity is sufficient, and a reservation overlaps with other reservations having higher priority.

When the recording destination cannot record the program (NO in step S304), processing proceeds to step S305. When the recording destination can record the program (YES in step S304), processing proceeds to step S306.

In step S305, the recording destination designation unit 82 determines a alternative recording destination.

A condition that the recording permission/inhibition determination unit 84 determines that the alternative recording destination can record the program, is requisite. If the alternative recording destination can record the program, the copying/move permission/inhibition determination unit 86 determines as another condition that the program can be copied or moved from the alternative recording destination to a future recording destination. Furthermore, a condition that the program can be recorded in the alternative recording medium in the designated recording mode, needs to be satisfied.

When the apparatus cannot find out an alternative recording destination satisfying these conditions, an alternative recording destination is searched again by easing step by step the conditions that the program can be copied or moved from a alternative recording destination to a future recording destination, and the program can be recorded in an alternative recording destination in the designated recording mode. It is previously determined which condition is given preference.

When the alternative recording destination is determined, the recording destination designation unit 82 confirms whether the alternative recording destination is able to execute the image recording. For example, the recording destination designation unit 82 checks whether a disk is inserted, recording capacity is sufficient, and a reservation overlaps with the other reservation having higher priority. If the alternative recording destination cannot record the program either, the apparatus searches for another alternative recording destination.

In steps S304 to S306, until a specified time just before starting recording (10 seconds before starting the recording in this embodiment), the apparatus tries to determine the alternative recording destination and makes preparation for image recording in the alternative recording destination, while waiting for a state that the designated recording destination can execute image recording. In step S306, if it reaches 10 seconds before starting image recording (YES in step S306), processing proceeds to step S307.

In step S307, if the designated recording destination is able to execute image recording (YES in step S307), processing proceeds to step S310 and the image recording is performed on the designated recording destination.

In step S307, if the designated recording destination is not able to execute image recording (NO in step S307), processing proceeds to step S308.

In step S308, if the alternative recording destination is able to execute image recording (YES in step S308), processing proceeds to step S309 and the image recording is performed on the alternative recording destination.

In step S308, if the alternative recording destination is not able to execute image recording (NO in step S308), processing repeats steps S307, S308 and S311 and the apparatus waits for a state that the designated recording destination or the alternative recording destination is able to execute image recording.

Since the aforementioned processing is executed without a user's operation, the apparatus is able to execute the image recording to an alternative recording destination even when a user is not present.

Further, by displaying a message on a television receiver or a recorder at a time of determining an alternative recording destination, a user can change the alternative recording destination by the recording destination designation unit 82 as needed. Alternatively, a mail is transmitted to a user's cellular phone from a television receiver and a user can send a reply mail with a command to change the alternative recording destination to the television receiver as needed.

Accordingly, in the program recording control apparatus according to the present exemplary embodiment, when the designated recording destination is not able to execute image recording, the apparatus can select a recording medium capable of copying and moving a program to another recording medium which will be used for recording the program in future as a alternative recording destination.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-064248 filed Mar. 13, 2008, which is hereby incorporated by reference herein in its entirety.

What is claimed is:

1. A recording apparatus comprising:
an acquisition unit that acquires information data selected from a plurality of pieces of information data;
a selection unit that selects one of a plurality of different types of recording devices in accordance with an instruction from a user;
a recording unit that records the selected information data acquired by the acquisition unit on the recording device selected by the selection unit;
an output unit that outputs information to a display device;
a control unit that controls the output unit,
wherein if one of the plurality of recording devices is selected by the selection unit, the control unit controls the output unit to output to the display device first information relating to a recording device onto which the selected information data read from the selected recording device is permitted to be recorded among the plurality of recording devices other than the selected recording device in accordance with a copy control attribute of the selected information data acquired by the acquisition unit, a type of the selected recording device and types of the recording devices other than the selected recording device.

2. An apparatus according to claim 1, wherein the control unit controls the output unit to output to the display device the first information before recording of the selected information data on the selected recording device by the recording unit.

3. An apparatus according to claim 1, wherein the control unit controls the output unit so that second information indicating that the information data read from the selected recording device can be copied and third information indicating that the information data read from the selected recording device can be moved are displayed on the same screen on which the first information is displayed.

4. An apparatus according to claim 1, wherein the recording unit records information data on the selected recording medium via an interface for the selected recording device among a plurality of different types of interfaces.

5. An apparatus according to claim 1, wherein the first information includes information relating to a recording device onto which the information data read from the selected recording device is permitted to be recorded and information relating to a recording device onto which the information data read from the selected recording device is inhibited from being recorded.

6. An apparatus according to claim 1, wherein the control unit controls the output unit so that information relating to the selected recording device and the first information are displayed on the same screen.

7. A recording method comprising:
acquiring information data selected from a plurality of pieces of information data;
selecting one of a plurality of different types of recording devices in accordance with an instruction from a user;
recording the selected information data acquired on the recording device selected;
outputting information to a display device;
controlling the output unit,
wherein if one of the plurality of recording devices is selected, outputting first information relating to a recording device onto which the selected information data read from the selected recording device is permitted to be recorded among the plurality of recording devices other than the selected recording device in accordance with a copy control attribute of the selected information data acquired, a type of the selected recording device and types of the recording devices other than the selected recording device.

8. A method according to claim 7, wherein in the control step, output to the display device is controlled to display the first information before the recording of the selected information data on the selected recording device.

9. A method according to claim 7, wherein in the control step, output is controlled so that second information indicating that the information data read from the selected recording device can be copied and third information indicating that the information data read from the selected recording device can be moved are displayed on the same screen on which the first information is displayed.

10. A method according to claim 7, wherein the recording step information data is recorded on the selected recording medium via an interface for the selected recording device among a plurality of different types of interfaces.

11. A method according to claim 7, wherein the first information includes information relating to a recording device onto which the information data read from the selected recording device is permitted to be recorded and information relating to a recording device onto which the information data read from the selected recording device is inhibited from being recorded.

12. A method according to claim 7, wherein in the control step, output is controlled so that information relating to the selected recording device and the first information are displayed on the same screen.

* * * * *